Dec. 8, 1925.
C. E. WEAVER
FRONT AXLE ASSEMBLY
Filed July 18, 1921
1,564,653
2 Sheets-Sheet 2
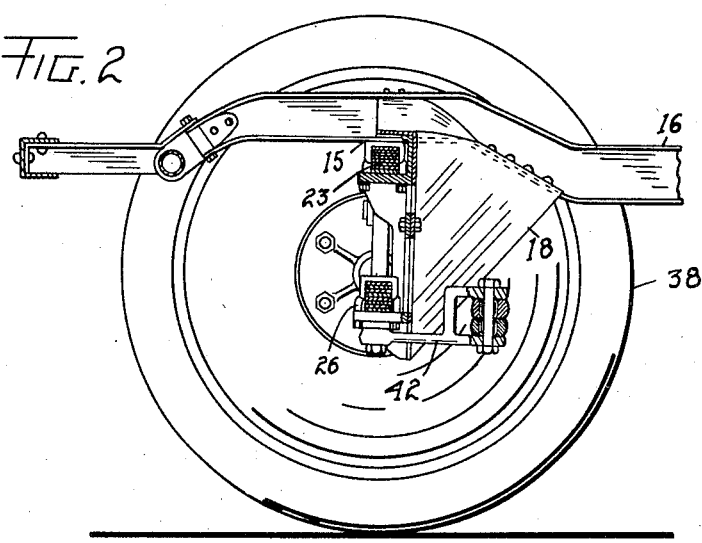
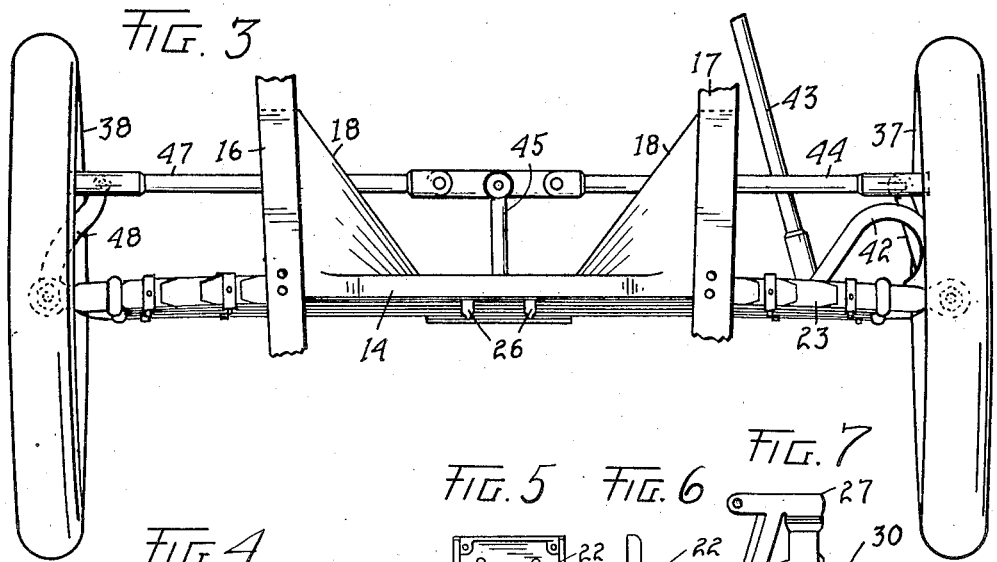
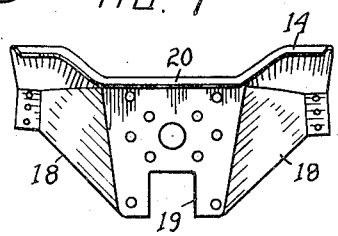
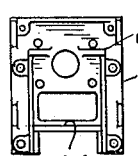
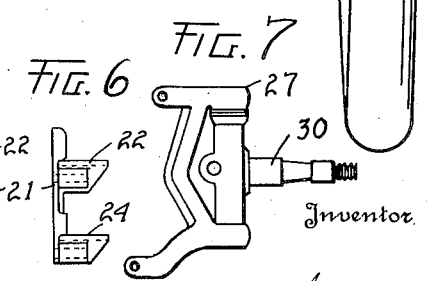

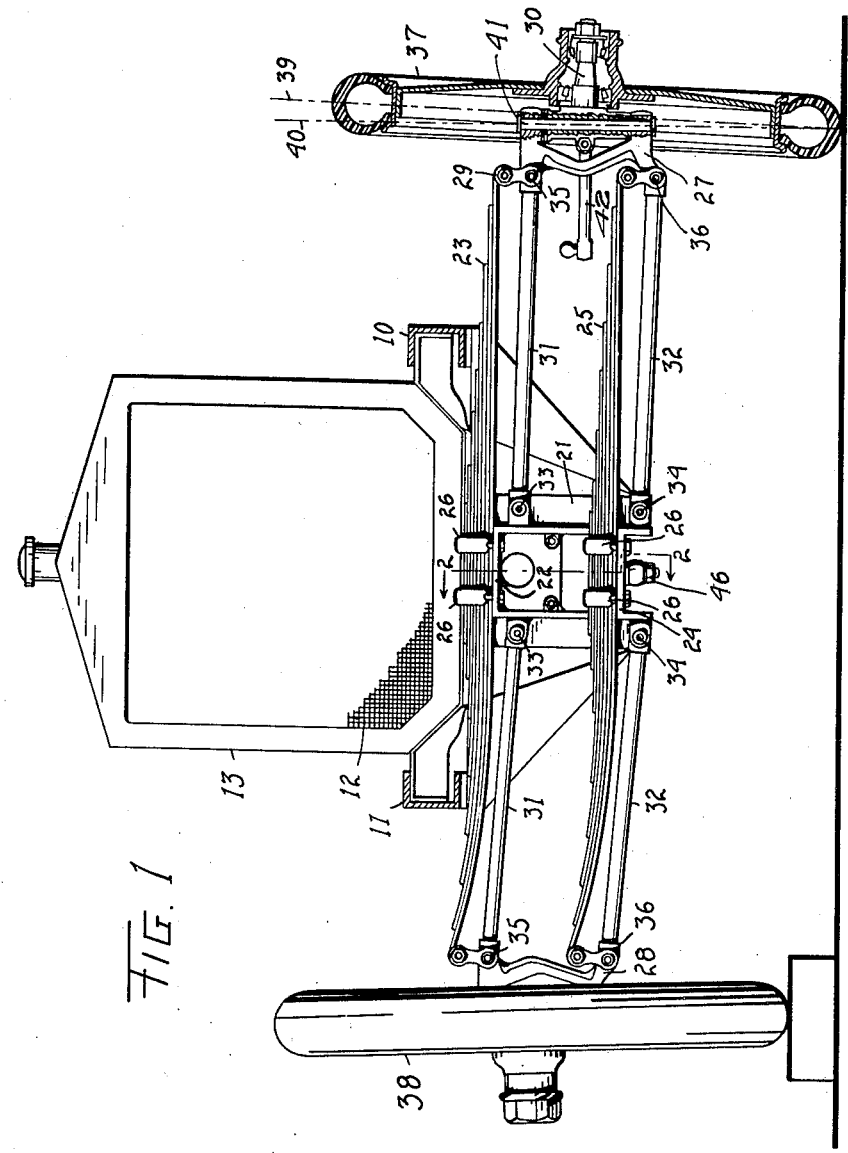

Patented Dec. 8, 1925.

1,564,653

UNITED STATES PATENT OFFICE.

CAIUS E. WEAVER, OF SYRACUSE, NEW YORK, ASSIGNOR TO BIRMINGHAM MOTORS, OF JAMESTOWN, NEW YORK, A TRUST.

FRONT-AXLE ASSEMBLY.

Application filed July 18, 1921. Serial No. 485,597.

*To all whom it may concern:*

Be it known that I, CAIUS E. WEAVER, a citizen of the United States, residing at the city of Syracuse, in the county of Onondaga and State of New York, have invented certain new and useful Improvements in Front-Axle Assemblies, of which the following, taken in connection with the accompanying drawings, is a specification.

The invention relates to the front axle portion of the chassis of an automobile; and the object of the improvement is to provide a double cross spring suspension for the automobile frame which is so arranged and controlled by upper and lower radius rods that each wheel may move vertically independent not only of the other, but also of said frame and the remainder of the automobile, yet at the same time said double cross spring suspension vertically tensions each wheel to normally hold it to its work upon the roadway, thereby largely overcoming any tendency to skid when running rapidly in turning corners and reducing the unsprung weight of the front portion of the automobile substantially to a minimum; and the invention consists in the novel features and combinations hereinafter set forth and claimed.

In the drawings, Figure 1 is a front elevation of the automobile with the one wheel in section showing the spindle bolt setting and carrier yoke construction, also the tubular parallels or radius rods which ensure permanent alinement of the wheels, one wheel being shown in the raised position as when passing over a stone or any obstruction, and also the parts adapting themselves to the deflection consequent to said raised position. Fig. 2 is a sectional view of the front axle construction at line 2—2 in Fig. 1 showing the forward end portion of the automobile frame and the connection and support of said frame upon the double crosswise spring suspension. Fig. 3 is a top plan view of said front axle assembly. Fig. 4 is a perspective view of the front cross member with its downwardly and rearwardly projecting gussets, and its central apron for attachment to the frame and the front column plate. Fig. 5 is a front elevation of said front column plate or spring support showing the preferred design and arrangement of the same; and Fig. 6 is a side elevation of the same showing the seats or pads for the crosswise semi-elliptical springs. Fig. 7 is a detail perspective view of one of the carrier yoke and spindle members for connecting the outer ends of the springs and radius rods.

Like characters of reference refer to corresponding parts in the several views.

The numerals 10 and 11 designate the front members of the automobile frame which support the radiator 12 with its hood 13 upon the front cross member 14.

The front cross member 14 is preferably a struck-up sheet metal member having the heavy crosswise angle portion 15 which is bent upwardly and attached within the channel-shaped front frame portions 16 and 17 at each side and extending rearward within said channel-shaped frame portions and firmly attached thereto. It has the downwardly and rearwardly extending triangular shaped gussets 18 at each side and the central flat apron portion 19 which extends downward from the top crosswise angular flange 20 at a slightly forward angle so as to hold the entire cross member construction at said slightly forward angle, preferably about one degree and seven minutes to thereby take the minor shocks and prevent the balancing forward of said front axle assembly.

A front column plate 21 is attached in suitable holes and by means of bolts to the front apron portion 19, which column plate 21 has the angular projecting seat 22 for the upper cross spring 23 and the lower angular seat 24 for the lower cross spring 25. The sides and central portions of the plate 21 are provided with strengthening flanges and attaching holes therethrough for attachment to the front portion 19 of the cross member 14, thereby making said column plate 21, as it were, a portion of said cross member, stiffening and strengthening the entire member.

The springs 23 and 25 are attached to their central portion to the column plate 21 by means of suitable clips 26. The springs 23 and 25 are supported at their outer ends by means of the yoke carriers 27 and 28, being connected thereto by means of shackle links 29. The carrier yokes 27 and 28 have the spindles 30 extending out therefrom and a vertical hole therethrough for the king or spindle bolt so that the wheels turn on said king or spindle bolt placed vertically within each wheel 37 and 38 in steering the automobile, making as it were a caster effect in the front wheels, and thereby much easier turning of the same and easier steering for the automobile.

The carrier yokes 27 and 28 are connected to the column plate 21 by means of strong preferably tubular radius rods 31 and 32 at each side, said radius rods being pivotally attached at 33 and 34 to the column plate 21 and at 35 and 36 to the carrier yokes 27 and 28. Both pivotal attachments 35 and 36 are made to the opposite ends of the shackle links 29 from that of the ends of semi-elliptical leaf springs 23 and 25, the attaching bolts continuing through the attachments 35 and 36 to the carrier yokes 27 and 28. All of said attachments are also provided with oil-less bushings so as to eliminate as large a number of oil cups as possible on account of the oil cups requiring frequent attention. Such oil-less bushings are also used throughout the assembly wherever practical, as for example in the attachments of the ends of the springs 23 and 25 to the shackle links.

It will be observed that this arrangement of the crosswise springs 23 and 25 and the radius rods 31 and 32 at each side of the strong central column 21 provides a control for the wheels 37 and 38 which permits either wheel to move upward and downward vertically without interference with each other or with the remainder of the automobile. The radius rods and springs at each side form as it were parallelograms. The strong tubular rods 31 and 32 hold the wheels 37 and 38 firmly in alinement, the springs 23 and 25 constantly pressing downward to tension the wheels 37 and 38 in their pressure upon the roadway, returning said wheels to the roadway with a minimum loss of frictional contact therewith, thereby obtaining the maximum of frictional control of the parts in steering the automobile.

Also, the placing of the center line 39 of the tire directly under the center line 40 of the spindle bolt 41 ensures easy steering and lessens the strain on the steering mechanism on rough roads. By setting the crosswise suspension at a forward angle of one degree and seven minutes to the front, all minor shocks are taken in the direction of the spring action. The spindle or king bolt 41 also sets at this angle, thereby making a caster effect in the front wheels which also means easier steering.

The steering mechanism of the front axle assembly consists of the left steering arm 42 which is connected by the drag link 43 to the steering wheel. The steering arm 42 is connected by a cross steering tube or link 44 to a strong central support 45 which is pivoted at 46 on the under side of the column plate 21. A companion link 47 to link 44 connects the central support 45 to the right steering arm, thereby giving complete connection between the steering arm 42 and the drag link 43 to the steering arm 48, and the wheel 38 to control the movement of the same. All of the connections to the central support 45 from said central support to the under side of the column plate 21 are pivotal so that said steering mechanism is free to move backward and forward as desired.

What is claimed as new is:

1. In combination with the frame and the front wheels of an automobile, a cross member secured to the front of the sides of the frame, and having rearwardly and upwardly extending triangular gussets along its sides and a central apron, a column plate attached to said apron and having horizontal upper and lower spring seats projecting forwardly therefrom, leaf springs centrally secured to said seats, carriers for the wheels connected to the outer ends of the springs, radius rods pivoted at their ends to the carriers and to the column plate, and steering mechanism for the front wheels, including a central support pivoted to the under face of the bottom of the column plate, and links connected to the central support and to the wheel carriers.

2. In combination with the frame and the front wheels of an automobile, a cross member secured to the front of the sides of the frame and having rearwardly and upwardly extending triangular gussets along its sides and a central apron, a column plate attached to said apron and having horizontal upper and lower spring seats projecting forwardly therefrom, leaf springs centrally secured to said seats, carriers for the wheels connected to the outer ends of the springs, and radius rods pivoted at their ends to the carriers and to the column plate.

3. In combination with the side members of the frame of an automobile and the front wheels thereof, a front cross member of substantially V-form having the upper parts of its sides secured to and depending from the respective side members of the automobile frame and having a central apron, a column plate attached to the apron and having upper and lower spring seats, carriers for the wheels, upper and lower leaf springs centrally secured to the respective seats and having their ends connected to the carriers, and radius rods connected at their ends to the respective carriers and to opposite sides of the column plate.

4. In combination with the side members of the frame of an automobile and the front wheels thereof, a front cross member secured to and depending from the respective side members of the automobile frame and having a central apron, a column plate attached to the apron and having integral substantially flat upper and lower spring seats, carriers for the wheels, upper and lower leaf springs centrally secured to the respective seats and having their ends connected to the carriers, radius rods connected at one of their ends to the respective carriers and integral means on opposite sides of the column plate pivotally connected to the opposite ends of the radius rods.

5. In combination with the frame and front wheels of an automobile, a carrier for each wheel, spaced upper and lower radius rods for each carrier, each radius rod being pivotally connected at its outer end to its carrier and pivotally connected to the frame at its inner end, upper and lower leaf springs disposed at a spaced distance above the respective upper and lower radius rods, means to rigidly secure the central portions of the springs to the frame, and shackle links pivoted at their upper ends to the springs and at their lower ends to the carriers and disposed in the said spaces between the springs and radius rods.

In testimony whereof, I have affixed my signature.

CAIUS E. WEAVER.